(12) United States Patent
Ponzano

(10) Patent No.: US 6,409,895 B1
(45) Date of Patent: Jun. 25, 2002

(54) ELECTROLYTIC CELL AND METHOD FOR ELECTROLYSIS

(75) Inventor: Gian Piero Ponzano, Genoa (IT)

(73) Assignee: Alcavis International, Inc., Gaithersburg, MD (US)

( * ) Notice: Subject to any disclaimer, the term of this patent is extended or adjusted under 35 U.S.C. 154(b) by 0 days.

(21) Appl. No.: 09/552,645

(22) Filed: Apr. 19, 2000

(51) Int. Cl.⁷ .................................................. C25B 9/00
(52) U.S. Cl. ....................................... 204/260; 204/263
(58) Field of Search ................................ 204/253, 257, 204/260, 262, 263, 267, 269, 272, 274, 275.1

(56) References Cited

U.S. PATENT DOCUMENTS

| | | | |
|---|---|---|---|
| 2,681,887 A | 6/1954 | Butler, Jr. | 204/258 |
| 2,870,074 A | 1/1959 | Parker | 204/98 |
| 3,076,754 A | 2/1963 | Evans | 204/237 |
| 3,390,065 A | 6/1968 | Cooper | 204/95 |
| 3,464,910 A | 9/1969 | Krebs et al. | 204/219 |
| 3,507,768 A | 4/1970 | Adaev et al. | 204/243 |
| 3,718,540 A | 2/1973 | Bailey | 204/272 |
| 3,721,619 A | 3/1973 | Ruehlen | 204/272 |
| 3,984,303 A | 10/1976 | Peters et al. | 204/260 |
| 4,177,116 A * | 12/1979 | DeNora et al. | 204/260 |
| 4,256,554 A * | 3/1981 | Bjorkman, Jr. | 204/260 |
| 4,285,786 A * | 8/1981 | Larson | 204/257 |
| 4,329,216 A | 5/1982 | DuBois | 204/252 |
| 4,439,295 A | 3/1984 | Richards | 204/229 |
| 4,481,303 A | 11/1984 | McIntyre et al. | 502/159 |
| 4,569,729 A | 2/1986 | Goto et al. | 204/23 |
| 4,784,735 A | 11/1988 | Sorenson | 204/98 |
| 5,873,986 A * | 2/1999 | Thompson, III et al. | 204/272 |

FOREIGN PATENT DOCUMENTS

| | | |
|---|---|---|
| GB | 544608 | 9/1941 |
| GB | 1539521 | 1/1979 |

OTHER PUBLICATIONS

International Search Report of PCT/US 01/12650 (Jan. 3, 2002).

* cited by examiner

Primary Examiner—Bruce F. Bell
(74) Attorney, Agent, or Firm—Finnegan, Henderson, Farabow, Garrett & Dunner, L.L.P.

(57) ABSTRACT

An electrolytic cell is provided for producing a sodium hypochlorite solution with active chlorine from brine. A plurality of the cells are typically employed with provision for cooling the electrolyte. The cell comprises a cylindrical metallic cathode with a smaller cylindrical metallic anode disposed within the cathode to define an annular passage through which the electrolyte passes. In preferred embodiments, the annular passage can contain particulate material such as carbon to enhance surface contact, and an anionic membrane can be provided between the anode and cathode to divide the annular passage into two chambers.

25 Claims, 10 Drawing Sheets

ELECTROLYTIC CELL AND METHOD FOR ELECTROLYSIS

BACKGROUND OF THE INVENTION

1. Field of the Invention

This invention relates to an electrolytic cell useful for the production of sodium hypochlorite from brine.

2. Discussion of the Related Art

It has long been known in the art that the electrolysis of brine produces chlorine, sodium hydroxide, and hydrogen according to the equation:

$$2NaCl + 2H_2O => 2NaOH + Cl_2 + H_2$$

or, alternatively, sodium hypochlorite and hydrogen according to the equation:

$$NaCl + 2H_2O => NaOCl + 2H_2.$$

The methods and apparatus utilized in performing the electrolysis have varied widely, but one factor has remained constant—the need for large tanks and multiple anodes and cathodes in order to obtain the desired amount of product. Such equipment is bulky, expensive, and inefficient, however, as represented by U.S. Pat. No. 3,721,619 to Ruehlen which discloses a large electrolytic cell holding tank in which multiple cells are utilized. The individual cells have a rod-like anode surrounded by an auxiliary cathode of a steel or stainless steel screen or perforated sheet and further surrounded by an additional cathode. The anode consists of a core of a metal conductor such as copper surrounded by a first layer of nonporous carbon and a second layer of porous carbon.

In addition, there are a variety of other electrolytic cell designs which have been proposed utilizing a coaxially-arranged anode and cathode. Some of these are represented by the following patents.

U.S. Pat. No. 3,076,754 to Evans discloses an electrolytic cell having a hollow anode and hollow cathode arranged coaxially, with the anode surrounding the cathode. The electrolyte passes between the electrodes and water is pumped through the interior of the cathode to cool the cell. The reference uses titanium or platinum-coated titanium for the electrodes of the cell due to the allegedly superior erosion resistance of these materials.

U.S. Pat. No. 3,390,065 to Cooper discloses an electrolytic cell consisting of coaxial tubular electrodes, with the inner electrode preferably being the anode. Cooper also discloses the use of cooling water pumped through the interior electrode. A diaphragm is located between the two electrodes to divide the annular space into an anode compartment and a cathode compartment. This reference discloses using titanium or noble element-coated titanium as the electrode material.

U.S. Pat. No. 3,984,303 to Peters et al. discloses an electrolytic cell having hollow liquid-permeable electrodes arranged coaxially, the anode within the cathode. A tubular ion-permeable membrane is located on the outside of the anode to separate the anolyte layer from the catholyte layer. The cathode is formed from iron, mild steel, nickel, or alloys thereof. The anode is a valve metal such as titanium, tantalum, zirconium, tungsten, or the like, and has a coating of a platinum-group metal or of mixed oxides of valve metal and platinum-group metal. No coolant is pumped through the hollow interior of the anode.

U.S. Pat. No. 4,784,735 to Sorenson discloses an electrolytic cell having an interior tube for recycling catholytic fluid surrounded coaxially by a liquid-permeable cathode, an ion permeable membrane, and then a liquid-permeable anode. Coolant is not pumped through the cell. To obtain the liquid-permeability, the electrodes constitute, for example, perforated or punched plate, or woven wire. The anode metal may be tantalum, tungsten, columbium, zirconium, molybdenum, or alloys containing such metals, but is preferably titanium. The disclosed cathode materials are iron, nickel, lead, molybdenum, cobalt, or alloys containing large amounts of such metals.

Variations of the physical form of the electrodes have also been introduced, as shown by U.S. Pat. No. 4,481,303 to McIntyre et al., which discloses particles suitable for use as electrode material. The particles consist of a substrate such as graphite at least partially, but preferably, fully covered by a coating, the coating containing a binder and a conductive catalyst. The substrate particles may be smaller than about 0.3 mm or larger than about 2.5 cm, but the preferred range is from about 0.7 mm to 4 mm (700–4000 $\mu$m).

As can be seen from these patents, those in the art have continued to strive for more efficient, less expensive electrolytic cells. The differing cells reflected by the patents above show the wide variety of approaches that have been taken.

The need exists, however, for electrolytic cells which are able to produce chlorine from brine more efficiently and less expensively.

SUMMARY OF THE INVENTION

According to the present invention, sodium hypochlorite with active chlorine ions in aqueous solution is produced from brine using an electrolytic cell having cylindrical metallic electrodes that can include a fixed bed of minute particulate matter to increase the surface area of the electrodes.

The electrolytic cell of the present invention comprises a hollow metallic cylindrical cathode and an metallic cylindrical anode disposed coaxially within the cathode to define an annular passage therebetween. The passage may contain particulate carbon having, for example, an average diameter of about 1000 micrometers.

The electrolytic cell of the invention can also include a cylindrical membrane disposed within the annular passage to divide it into anodic and cathodic chambers.

The method for using an electrolytic cell of the present invention includes passing a solution through the annular passages provided between the hollow cylindrical cathode and a hollow cylindrical anode disposed coaxially within the cathode and applying a voltage to the cell to electrolytically produce a hypochlorite solution. A plurality of electrolytic cells can be employed sequentially in accordance with the invention. Heat exchangers can be positioned in series between the electrolytic cells to control the temperature of solution passing between the cells. The cooling system can include an external heat exchange system, double for divided cell and single for undivided cell.

Both the foregoing general description and the following detailed description contain examples of the invention and do not, by themselves, restrict the scope of the appended claims.

BRIEF DESCRIPTION OF THE DRAWINGS

The accompanying drawings, which constitute a part of this specification, illustrate systems and methods consistent with the invention and, together with the description, help explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

The present invention provides an electrolytic cell and system that produce sodium hypochlorite with active chlorine from brine. The present invention includes a cell comprising cathode and an anode that are hollow cylinders arranged coaxially in the electrolytic cell with the anode being positioned within the cathode. Brine flows through the annular space formed between the cathode and anode. When the electrolyte leaves the annular space, it enters an external tubular heat exchanger to maintain correct temperature of the electrolyte and then enters in the anodic and cathodic zone of the second cell and so on. When the correct concentration of free chlorine is reached, in the anolyte (final product) it leaves the system and the catholyte is recycled to the first cell and a new brine fed into the cathodic cell.

In one embodiment of the invention, the anode and cathode are each formed from metallic electrodes and minute particulate graphite having an average diameter of about 0.01 to 1 mm to create a substantial amount of open porosity and thereby maximize the surface area of the electrodes. By maximizing the surface area of the electrodes, the electrolytic cell has improved efficiency, requires less energy, less raw material, and less equipment to produce the same amount of chlorine as a conventional cell.

In a further embodiment of the invention, a porous anionic membrane is provided in the annular space between the cathode and anode to divide the annular space into anodic and cathodic chambers.

Figure 1:
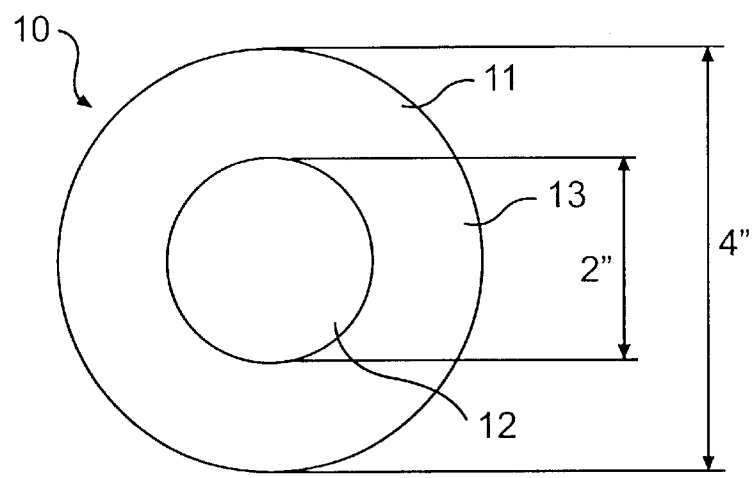
FIG. 1 is a top, cross section view of an electrolytic cell in accordance with one embodiment of the invention.
Figure 2:
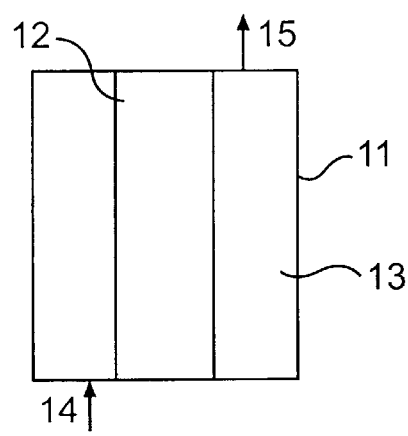
FIG. 2 is a side, cross section of the cell of FIG. 1.
Figure 3:
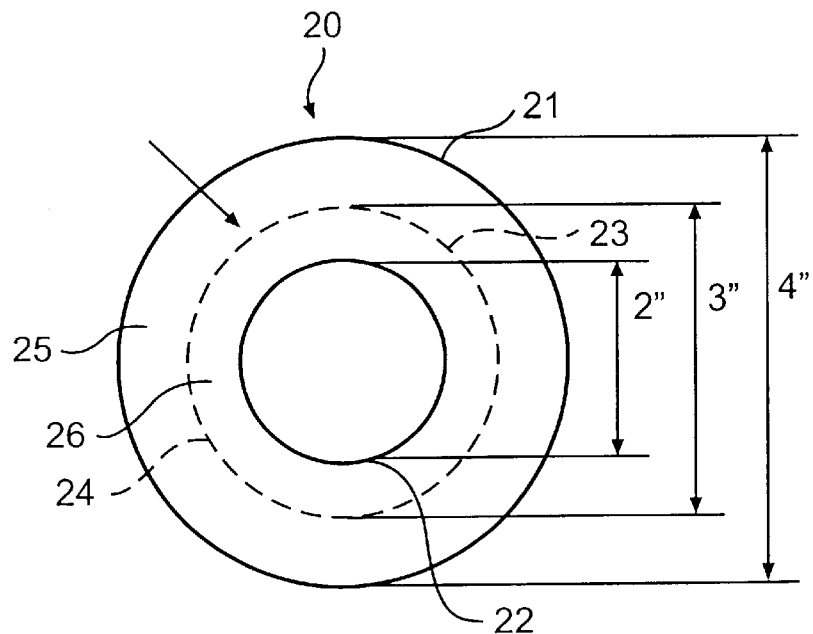
FIG. 3 is a top cross section of an electrolytic cell in accordance with another embodiment of the invention illustrating an anionic membrane to divide the annular space.

FIGS. 1 and 2 illustrate an embodiment of the present invention in which an electrolytic cell 10 has a hollow cylindrical cathode 11 and a hollow cylindric anode 12 disposed within the cathode to define an annular space 13 for passage of the solution being electrolyzed. FIG. 2, which is a cross section side view of cell 10, illustrates inlet 14 at the bottom of the cell for introduction of solution into annular space 13 and outlet 15 at the top of the cell for removal of the electrolyte solution. In a further embodiment of the invention, as illustrated in FIG. 15, the annular space 13 can contain particulate material such as graphite to maximize the surface area of the anode and cathode. In a further embodiment of the invention, a plurality of cells 10 can be connected in series such that electrolyte leaving one cell is introduced into the next succeeding cell. Temperature control of the electrolyte can be realized with heat exchangers placed between the cells to control the temperature of the flowing electrolytes.

Figure 4:
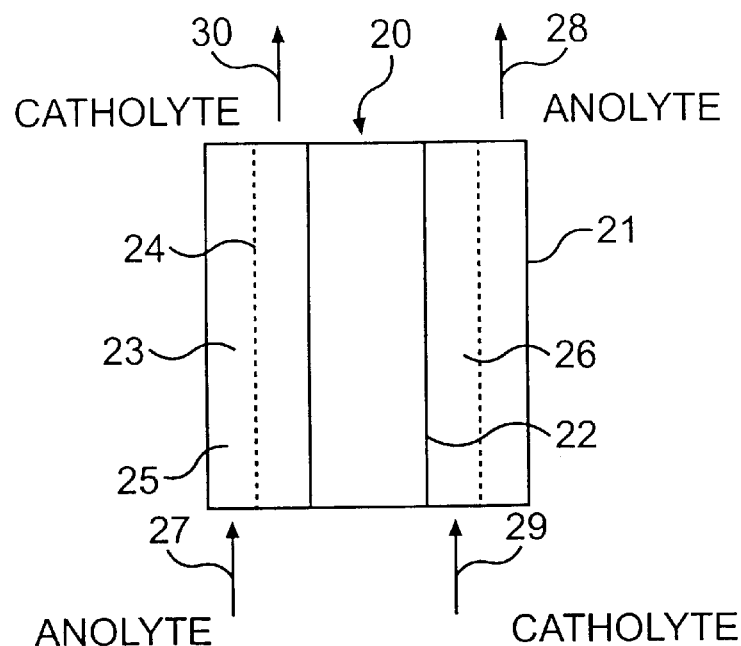
FIG. 4 is a side, cross section of the cell of FIG. 3.
Figure 5:
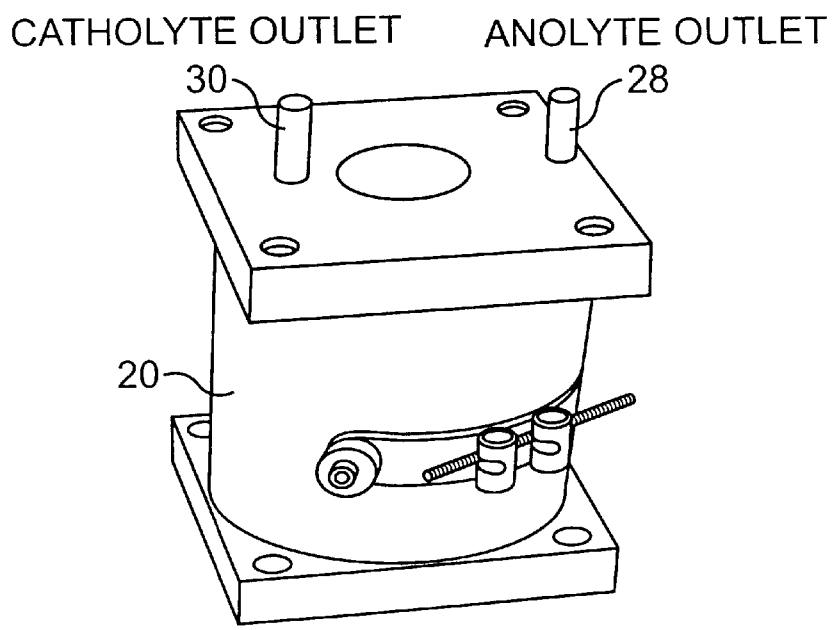
FIG. 5 is a side perspective view of the cell of FIGS. 3 and 4.
Figure 6:
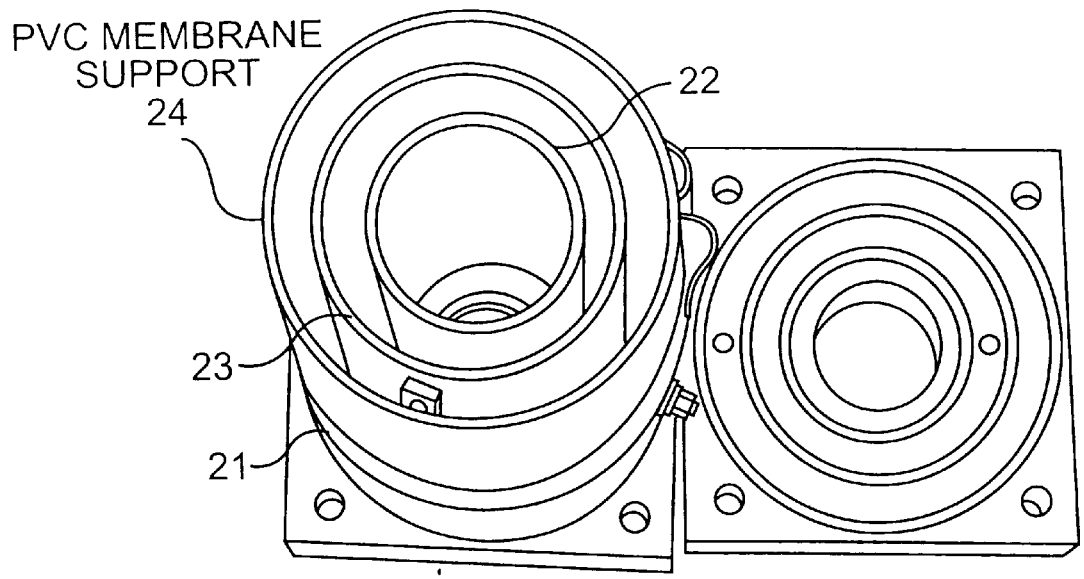
FIG. 6 is a top perspective showing the interior of the cell of FIG. 5.

A further embodiment of the invention is illustrated in FIGS. 3, 4, 5, and 6. Cell 20 comprises a hollow cylindrical cathode 21 and a hollow cylindrical anode 22 disposed coaxially within the cathode to define an annular space 23 which, as described above, can contain particulate carbon such as graphite having an average particle size of amount 0.1 to 1 mm. The annular space 23 is divided by a porous anodic membrane 24 disposed between the anode and cathode to define an anodic chamber 26 and cathodic chamber 25. As shown in FIG. 4, inlets 27 and 29 are provided for introduction of a solution such as brine and recycled catholyte. Outlets 28 and 30 are provided in the top of the cell for withdrawing electrolysis products that include sodium hypochlorite and active chlorine.

The anodes and cathodes employed in accordance with the invention are porous metallic cylinders which can, for example, be constructed of titanium. Preferably, the cathode is titanium covered by a layer of platinum and the anode is titanium covered with ruthenium oxide. Alternatively, the titanium can be coated with iridium oxide, palladium oxide, nickel oxide, or combinations thereof.

Though not critical to the invention, typically, the cathode can be a cylinder about four inches in diameter, the anode, two inches in diameter and the anionic membrane, three inches in diameter.

The annular space between the anode and the membrane, carries brine to be converted to sodium hypochlorite containing active chlorine at high concentration (>28 g/l). In the case of low chlorine concentration (<15 g/l), the membrane 24 is not necessary.

The present invention can be used to produce sodium hypochlorite with active chlorine by electrolyzing an alkali metal brine (NaCl solution). Brine is input into annular areas 25 and 26 of the electrolytic cell 20 and pumped through cell 20 using known pump systems. A voltage is applied to the cell 20 resulting in sodium hypochlorite with active chlorine being created at the anode 22 and hydrogen and NaOH being created at the cathode 21.

The overall cell reaction is as follows:

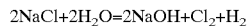

Using brine as input to the cell 20 of the present invention, the primary reactions for the production of hypochlorous ions are:
Anode
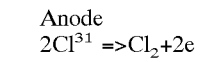
Cathode
$2H_2O + 2e \Rightarrow 2OH^- + H_2$
Solution
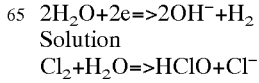

HClO=>H⁺+ClO⁻

The corresponding loss reactions are as follows:
Anode
6ClO⁻+3H₂O=>2ClO₃⁻+4Cl⁻+3/2O₂+6e
3H₂O=>O₂+4H⁺+4e
Cathode
ClO⁻+H₂O+2e=>2OH⁻
Solution
2HClO+ClO⁻=>ClO₃⁻+2Cl⁻+2H⁺
2ClO=>O₂+2Cl⁻

Figure 7:
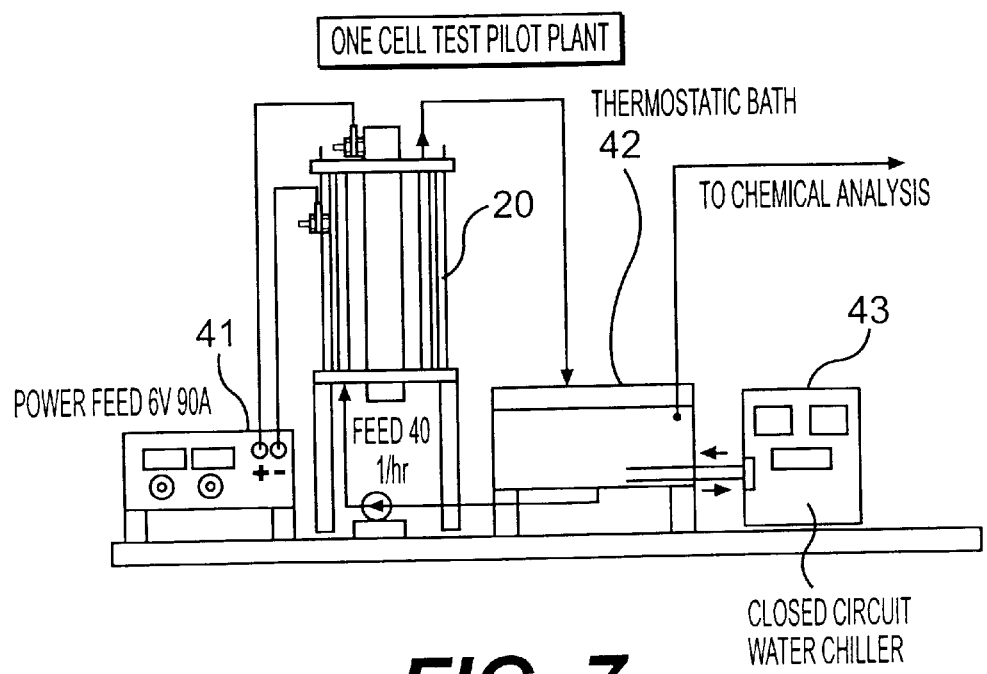
FIG. 7 shows a test cell pilot plant for testing the cell in accordance with the present invention.

FIG. 7 shows, as an example, a system 40 for determining the amount of chlorine produced by the cell 20 of the present invention. As shown, power is supplied to the cell 20 from power source 41. Brine is input from thermostatic bath 42 to the cell 20 for processing in the annular spaces 23. The thermostatic bath 42 is chilled by the closed circuit water chiller 43. In one embodiment, a single water chiller 43 is used when the electrolytic cell 20 does not have an anionic membrane. In another embodiment, two water chillers 43 are used, one for the anode and one for the cathode, when an anionic membrane is used in cell 20, as heretofore described. Coolant may also be passed through the interior of the anode. Cooling of the cell and brine decreases the cell resistance to a solution passing through the cell thereby increasing the amount of chlorine that can be obtained. Resulting solutions, that include NaCl and chlorine, are returned to the thermostatic bath 42 before being sent for chemical analysis. Gases are eliminated by an aspiration system. When the plant is topped, the system is flushed and new brine is input to the cells of the plant.

In one embodiment, a multi-cell system is composed of two series of ten cells each having an inlet temperature of 20° C. and an outlet temperature of about 23° C.

FIGS. 8–13 show sample results of tests performed using the test cell of FIG. 7.

Figure 8:
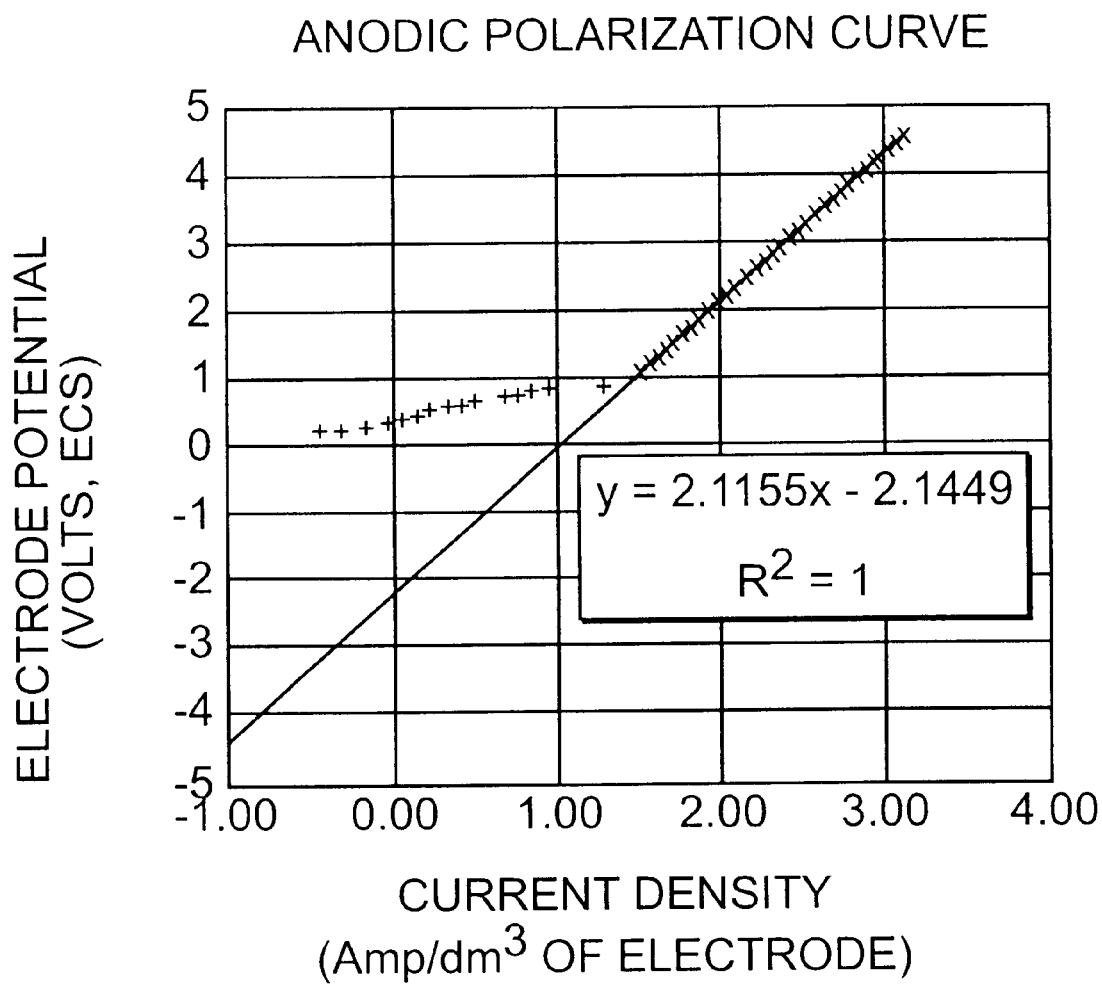
FIG. 8 shows a graph of the polarization curve of the anode in accordance with the present invention.
Figure 9:
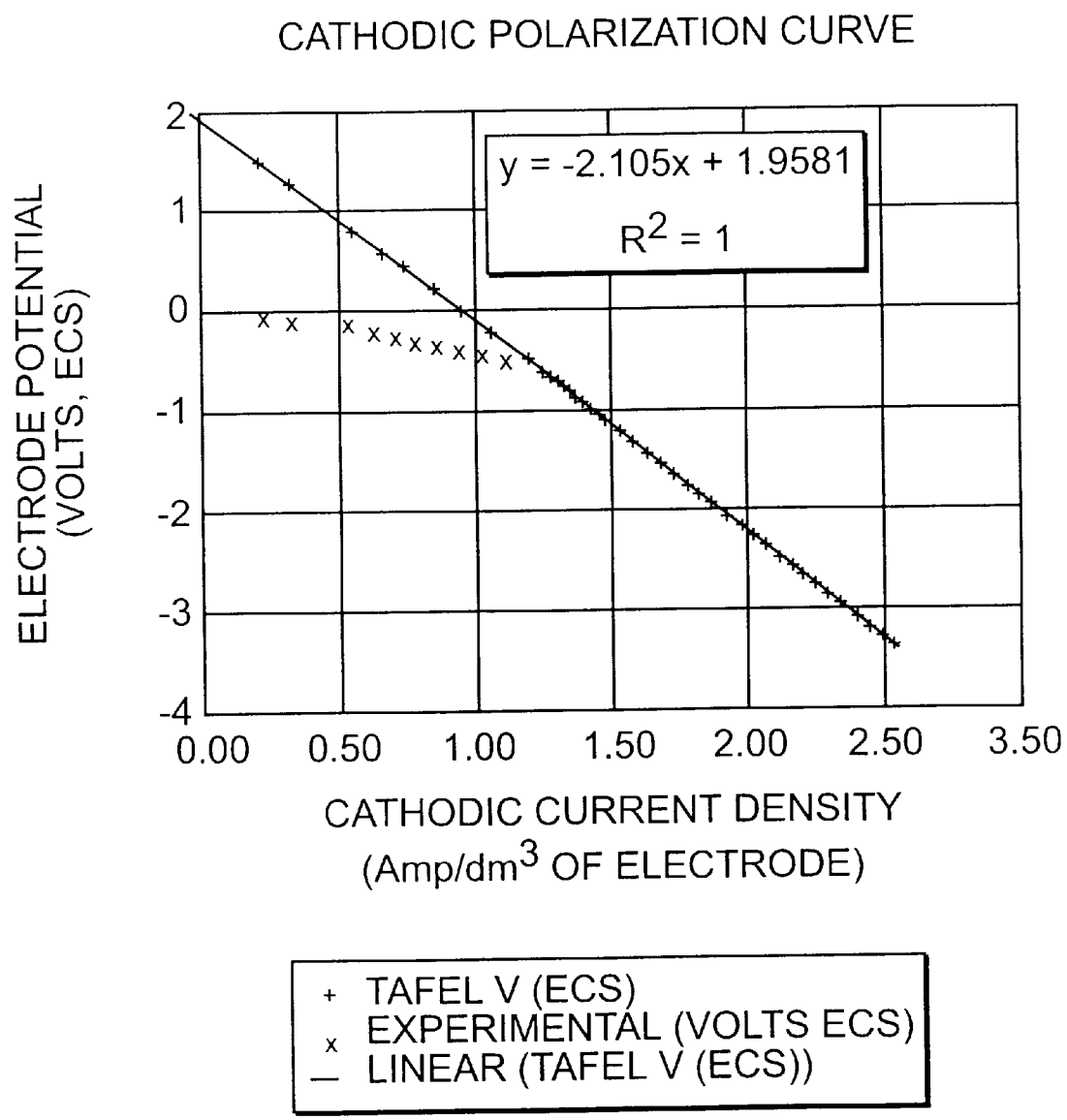
FIG. 9 shows a graph of the polarization curve of the cathode in accordance with the present invention.

The electrochemical characteristic of the packed electrodes in the example cell were tested resulting in the polarization curves shown in FIGS. 8 and 9. FIG. 8 shows the polarization curve for the anode while FIG. 9 shows a polarization curve for the cathode.

FIGS. 10–13 are graphs comparing the amount of current flowing through the electrolytic cell to the amount of active chlorine produced.

Figure 10:
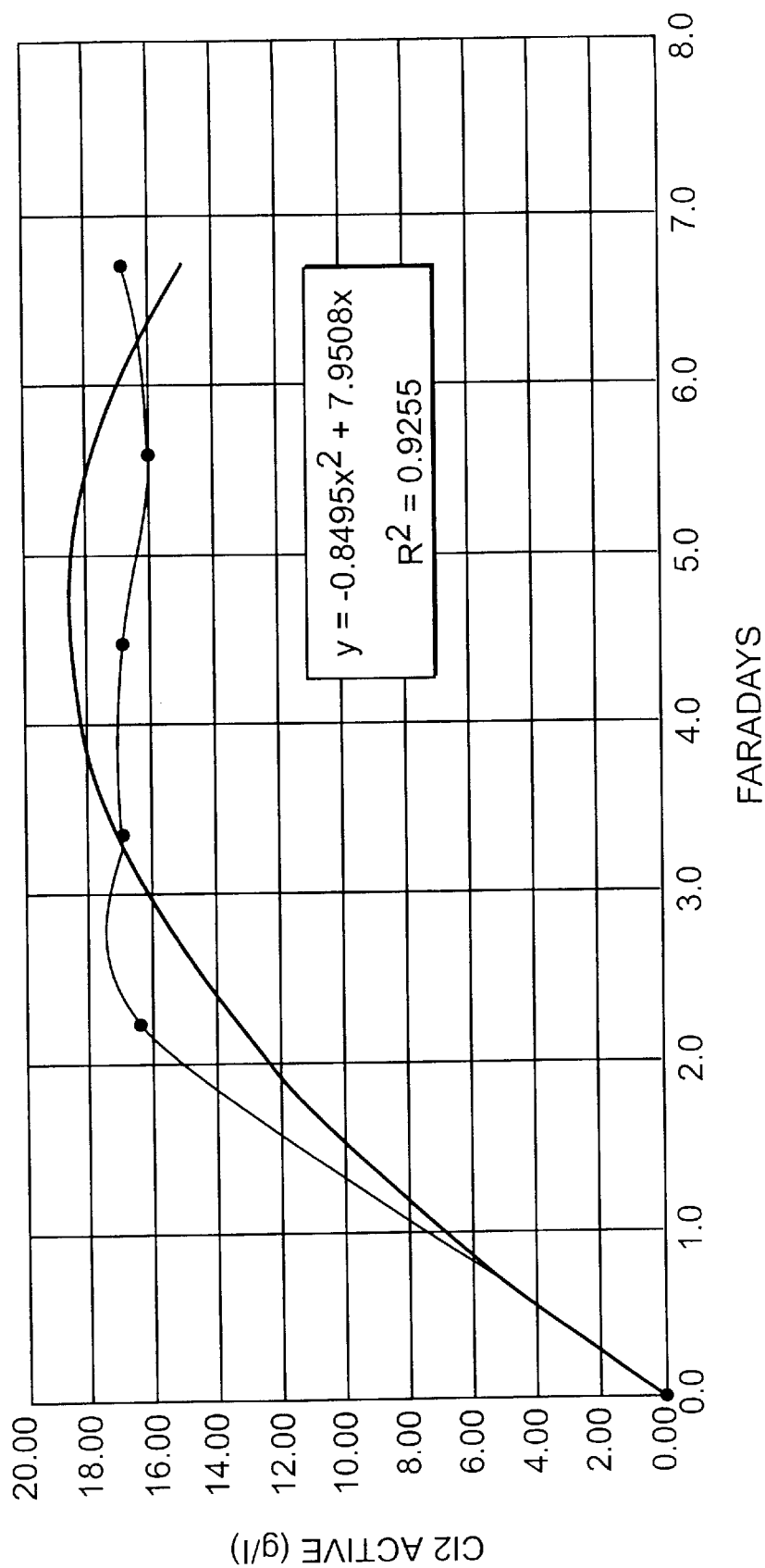
FIGS. 10–12 show graphs of a concentration of active chlorine versus a current flowing through the electrolytic cell in accordance with the present invention.
Figure 11:
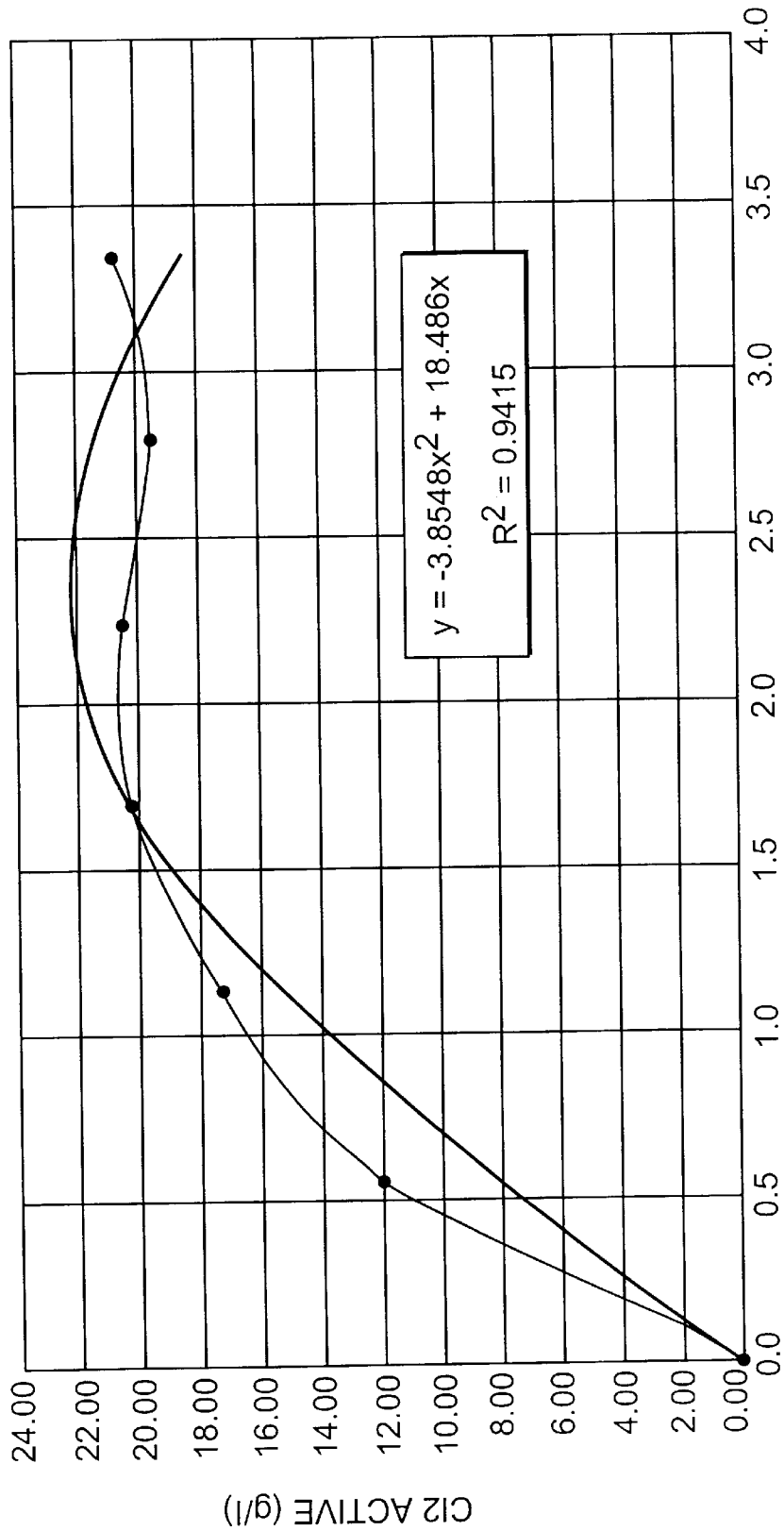
Figure 12:
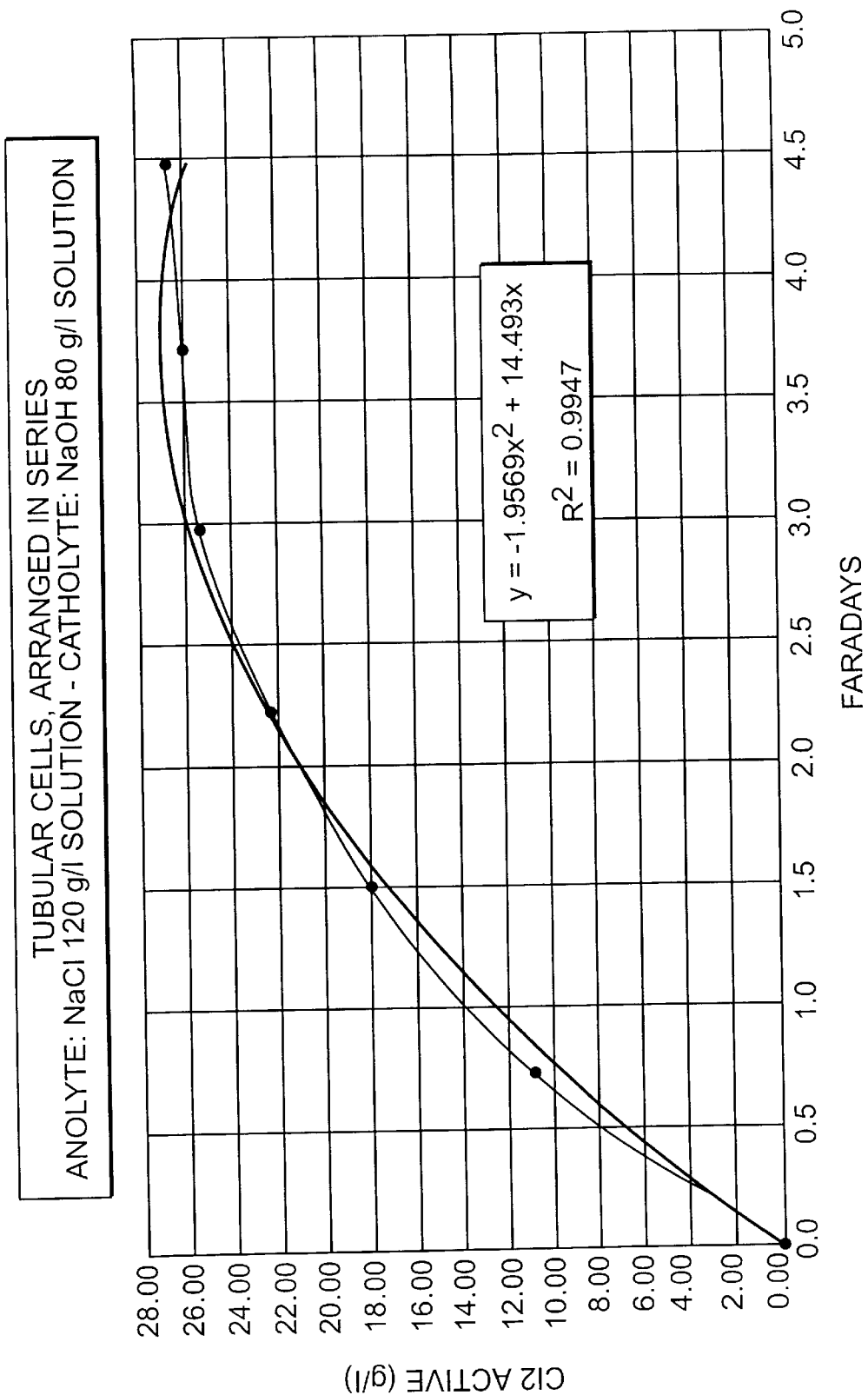
Figure 13:
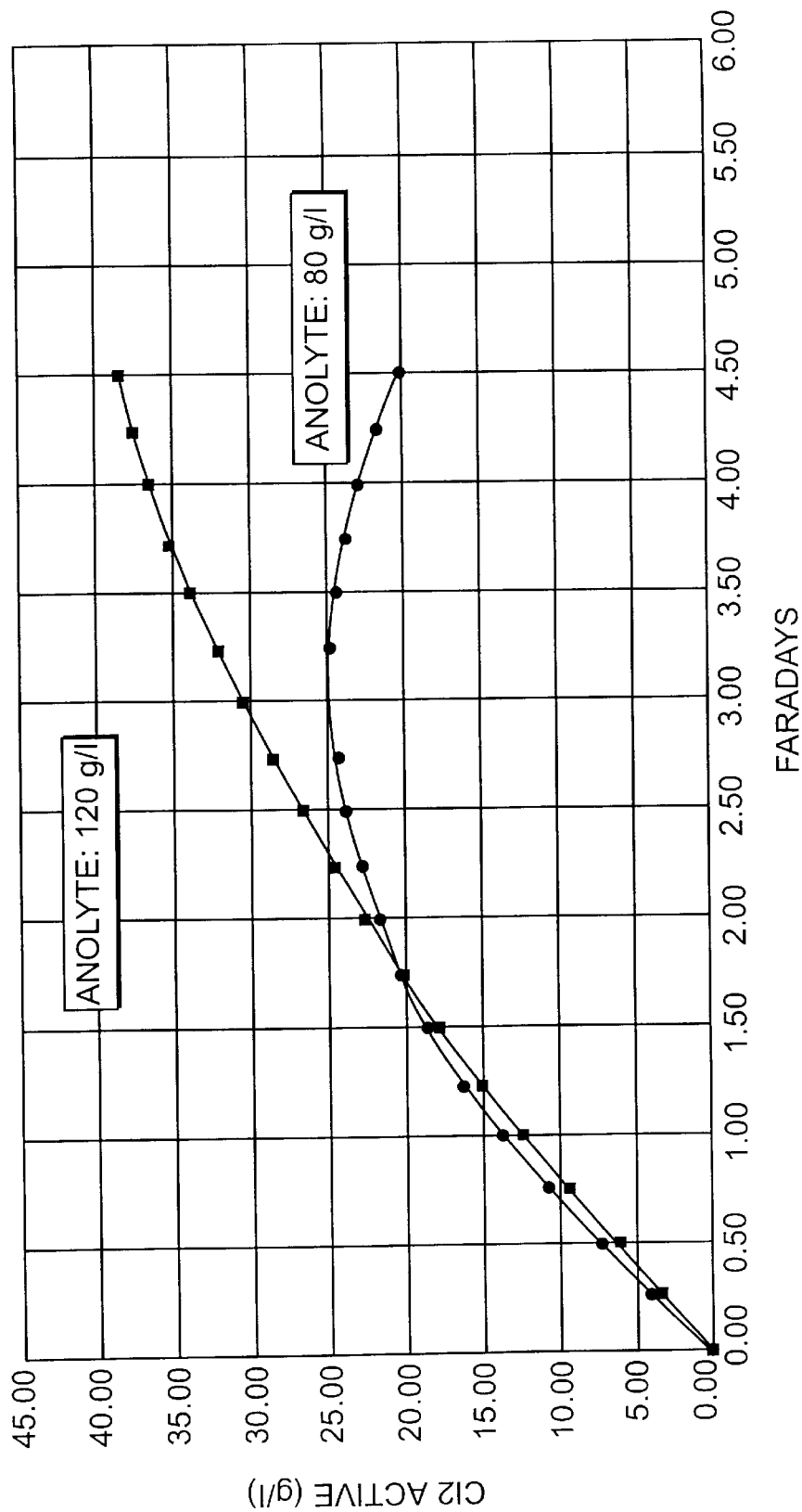
FIG. 13 shows a graph of a concentration of active chlorine versus a current flowing through an electrolytic cell having an anionic membrane in accordance with the present invention.

FIG. 10 shows the concentration resulting from using an anolyte of NaCl at 80 grams/liter and a catholyte of NaOH at 890 grams/liter. FIG. 11 shows the concentration from using an anolyte of 80 grams/liter of NaCl and a catholyte of 120 grams/liter of NaOH. FIG. 13 shows the concentration using an anolyte of 120 grams/liter of NaCl and a catholyte of 80 grams/liter of NaOH. The resulting amounts of active chlorine generally amount to more than 3% active chlorine concentration after electrolysis of brine using the present invention.

In one preferred embodiment of the present invention, the anode tubes are made of ruthenium oxide coated titanium and the cathode tubes are made of platinum coated titanium.

The use of an anionic membrane increases the amount of chloride that can be obtained by limiting the cathodic reduction of the hypochlorite.

In one embodiment, the system uses cells without an anionic membrane and produces sodium hypochlorite at 60 liters/hour with 1.2% active chlorine ions. In another embodiment, the system uses anionic membrane divided cells and produces sodium hypochlorite at 20 liters/hour with 3% active chlorine ions.

Figure 14:
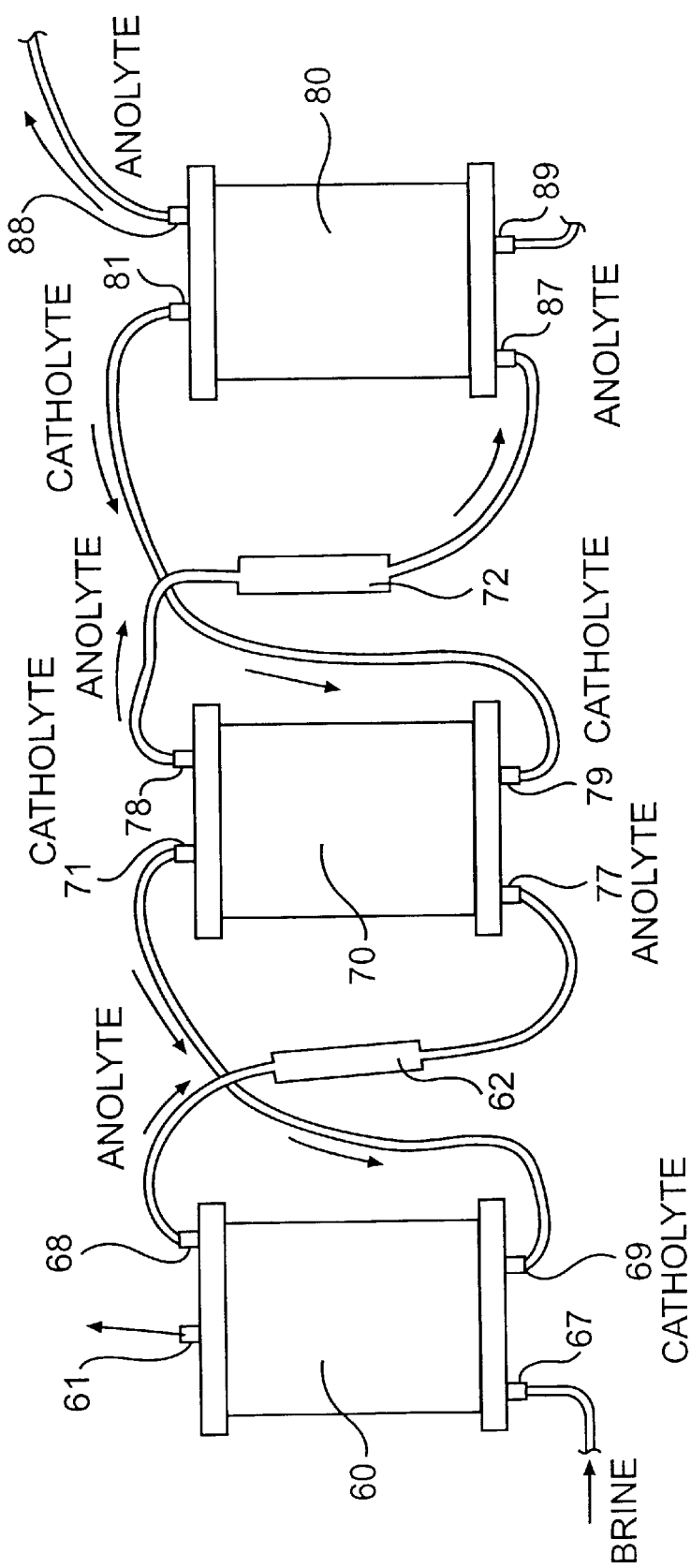
FIG. 14 shows three cells of the type illustrated in FIGS. 3–6, connected in series with heat exchangers in accordance with the invention.

FIG. 14 illustrates a portion of an exemplary system of the invention in which multiple cells are connected in series with heat exchangers interposed between the cells. Cells 60, 70, and 80 are electrolytic cells as heretofore described, having anodic and cathodic chambers separated by an anionic membrane. Each cell is provided with anolyte inlets (67, 77, and 87 respectively) catholyte inlets (69, 79, and 89 respectively), catholyte outlets (61, 71, 81, respectively), and anolyte outlets (68, 78, and 88 respectively). Brine enters cell 60 at 67 and recycled catholyte four cell 70 enters at 69. Anolyte leaves cell 60 at 68 and passes through heat exchangers 62 before entering cell 70 and 77. As indicated, the same sequence of procedures occurs between cells 70 and 80 and so on until the desired anolyte is achieved and removed from the system.

It will be apparent to those skilled in the art that various modifications and variations can be made to the electrolytic cell consistent with the present invention, without departing from the scope or spirit of the invention. Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A cell for electrolysis of brine to produce sodium hypochlorite and active chlorine, comprising:
   a hollow cylindrical cathode;
   a hollow cylindrical anode disposed coaxially within the cathode to define an annular space containing particulate carbon, for passage of said brine during electrolysis;
   a housing enclosing said cathode and anode;
   a membrane disposed between the anode and cathode within said annular space to define an anodic chamber and a cathodic chamber; and
   inlets for introduction of said brine into the annular space and outlets for withdrawing electrolysis products including said sodium hypochlorite and active chlorine.

2. The cell of claim 1 wherein said anode and cathode are porous metallic cylinders.

3. The cell of claim 1 wherein said particulate carbon is graphite.

4. The cell of claim 1 wherein said membrane is an anionic exchange membrane.

5. The cell of claim 1 wherein each of said anodic and cathodic chambers has at least one inlet and one outlet.

6. The cell of claim 1 wherein said particulate carbon is about 0.1 to 1 mm in average particle size.

7. A cell for electrolysis of a solution, comprising:
   a hollow cylindrical cathode;
   a hollow cylindrical anode, the anode disposed within the cathode to define an annular space for passage of said solution during electrolysis; and
   an inlet for introducing solution into the annular space and an outlet for withdrawing electrolysis products;
   wherein said annular space is divided by a membrane disposed between the anode and the cathode to form an anodic chamber between the anode and the membrane, and a cathodic chamber between the cathode and membrane; and
   wherein said annular space contains particulate carbon.

8. The cell of claim 7 wherein said anode and cathode are porous metallic cylinders.

9. The cell of claim 7 wherein said particulate carbon is graphite.

10. The cell of claim 7 wherein said membrane is an anionic exchange membrane.

11. The cell of claim 7 wherein said particulate carbon is about 0.1 to 1 mm in average particle size.

12. A method for electrolyzing a brine solution to a product comprising hypochlorite and active chlorine, said method comprising performing the electrolysis in the cell of claim 7.

13. A system for electrolysis of brine to produce sodium hypochlorite and active chlorine which comprises:
- a plurality of serially connected electrolytic cells, each cell having at least one inlet and at least one outlet, an inlet of each successive cell being connected with an outlet of the proceeding cell to transfer electrolyte between the cells;
- each said cell further comprising:
  - a hollow cylindrical cathode; and
  - a hollow cylindrical anode disposed within the cathode to define an annular space for passage of electrolyte solution during electrolysis.

14. The system of claim 13 wherein said annular space is divided into anodic and cathodic chambers by a membrane disposed between the cathode and anode.

15. The system of claim 14 wherein said membrane is an anionic membrane.

16. The system of claim 14 wherein each of said anodic and cathodic chambers has at least one inlet and one outlet.

17. The system of claim 13 wherein said annular space contains particulate carbon.

18. The system of claim 17 wherein said particulate carbon is graphite.

19. The system of claim 17 wherein said particulate carbon is about 0.1 to 1 mm in average particle size.

20. The system of claim 13 wherein said annular space is divided into anodic and cathodic chambers by an anionic membrane disposed between the cathode and anode, the anodic and cathodic chambers containing particulate carbon having an average particle size of about 0.1 to 1 mm, and each of said chambers having at least one inlet and one outlet.

21. The system of claim 20 wherein said particulate carbon is graphite.

22. The system of claim 20 wherein heat exchangers are provided between the electrolytic cells to control the temperature of the electrolyte transferred between the cells.

23. The system of claim 20 wherein said cathode and anode are porous metallic cylinders.

24. The system of claim 13 wherein heat exchangers are provided between the electrolytic cells to control the temperature of the electrolyte transferred between the cells.

25. The system of claim 13 wherein said cathode and anode are porous metallic cylinders.

* * * * *